United States Patent
Ariizumi et al.

(10) Patent No.: US 11,072,564 B2
(45) Date of Patent: Jul. 27, 2021

(54) DIELECTRIC CERAMIC COMPOSITION AND MULTILAYER CERAMIC ELECTRONIC COMPONENT

(71) Applicant: TDK CORPORATION, Tokyo (JP)

(72) Inventors: Takuma Ariizumi, Tokyo (JP); Toshihiko Kaneko, Tokyo (JP); Nobuto Morigasaki, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 48 days.

(21) Appl. No.: 16/511,286

(22) Filed: Jul. 15, 2019

(65) Prior Publication Data

US 2020/0039887 A1   Feb. 6, 2020

(30) Foreign Application Priority Data

Jul. 31, 2018   (JP) .............................. JP2018-144529

(51) Int. Cl.
| | |
|---|---|
| *C04B 35/47* | (2006.01) |
| *C04B 35/468* | (2006.01) |
| *C04B 35/49* | (2006.01) |
| *H01G 4/12* | (2006.01) |
| *H01G 4/005* | (2006.01) |

(Continued)

(52) U.S. Cl.
CPC ............ *C04B 35/47* (2013.01); *C04B 35/468* (2013.01); *C04B 35/49* (2013.01); *C04B 35/62897* (2013.01); *H01G 4/005* (2013.01); *H01G 4/1218* (2013.01); *H01G 4/30* (2013.01); *C01P 2004/62* (2013.01); *C04B 2111/00939* (2013.01); *C04B 2111/94* (2013.01)

(58) Field of Classification Search
CPC ....... C04B 35/47; C04B 35/468; C04B 35/49; C04B 35/62897; C04B 2111/00939; C04B 2111/94; H01G 4/005; H01G 4/1218; H01G 4/30; C01P 2004/62

See application file for complete search history.

(56) References Cited

U.S. PATENT DOCUMENTS

2009/0225494 A1* 9/2009 Yamazaki ............ C04B 35/4682
361/321.4

FOREIGN PATENT DOCUMENTS

| JP | 2008-239402 A | 10/2008 |
| JP | 2008239402 | * 10/2008 |

(Continued)

OTHER PUBLICATIONS

JP2015153916 machine translation via EspaceNet (Year: 2015).*
JP2013129560 machine translation via EspaceNet (Year: 2013).*
JP2008239402 machine translation via EspaceNet (Year: 2008).*

*Primary Examiner* — Karl E Group
*Assistant Examiner* — Cameron K Miller
(74) *Attorney, Agent, or Firm* — Oliff PLC

(57) ABSTRACT

A dielectric ceramic composition having improved insulation specific resistance and a highly accelerated lifetime. The dielectric ceramic composition includes a dielectric particle having a core-shell structure including a main component expressed by a general formula $ABO_3$, where A is Ba and the like, and B is Ti and the like), and a rare earth element component R, in which a shell part of the core-shell structure has an average rare earth element concentration C of 0.3 atom % or more. The rare earth element has a specified concentration gradient or concentration variation.

2 Claims, 3 Drawing Sheets

(51) Int. Cl.
*C04B 35/628* (2006.01)
*H01G 4/30* (2006.01)
*C04B 111/94* (2006.01)
*C04B 111/00* (2006.01)

(56) References Cited

FOREIGN PATENT DOCUMENTS

JP 2013129560 * 7/2013
JP 2015153916 * 8/2015

* cited by examiner

US 11,072,564 B2

DIELECTRIC CERAMIC COMPOSITION AND MULTILAYER CERAMIC ELECTRONIC COMPONENT

BACKGROUND OF THE INVENTION

The present invention relates to a dielectric ceramic composition. Also, the present invention relates to a multilayer ceramic electronic component such as a multilayer ceramic capacitor in which an internal electrode layer and a dielectric layer are stacked in alternating manner.

Recently, electronic devices have become more compact and have attained higher density. Along with this, a multilayer ceramic electronic component such as a multilayer ceramic capacitor and the like are also demanded to become more compact, to attain higher capacity, and to have improved reliability. Thus, it has been attempted to attain both improved reliability of the multilayer ceramic electronic component while increasing the stacking number of dielectric layers of the multilayer ceramic electronic component and making the dielectric layer itself thinner.

Patent document 1 discloses a dielectric ceramic composition constituted from a crystalline particle having a core-shell structure made of barium titanate including a rare earth element. The core-shell structure described in Patent document 1 has a highest concentration of a rare earth element at an outermost surface, and a concentration gradient of the rare earth element at a shell part is 0.05 atom %/nm or more.

In such core-shell particle having a large concentration gradient of a rare earth element, the rare earth element concentration of the shell part near an interface between the core part and the shell part is relatively low compared to the rare earth element concentration of other shell part. Therefore, an insulation specific resistance tends to easily deteriorate under high electric field intensity and a sufficient highly accelerated lifetime was unable to attain in some cases.

Patent document 1: JP Patent Application Laid Open No. 2008-239402

SUMMARY OF THE INVENTION

The present invention has been attained in view of such circumstances, and the object is to provide a dielectric ceramic composition having high insulation specific resistance and improved highly accelerated lifetime even under a high electric field intensity. Also, the object of the present invention is to provide a multilayer ceramic electronic component having a dielectric layer including the dielectric ceramic composition.

The dielectric ceramic composition according to a first embodiment of the present invention is a dielectric ceramic composition having a dielectric particle having a core-shell structure which includes a main component expressed by a general formula $ABO_3$ (A is at least one selected from Ba, Sr, and Ca; and B is at least one selected from Ti, Zr, and Hf) and a rare earth element component R (R is at least one selected from Sc, Y, La, Ce, Pr, Nd, Pm, Sm, Eu, Gd, Tb, Dy, Ho, Er, Tm, Yb, and Lu), in which a shell part of the core-shell structure has an average rare earth element concentration C of 0.3 atom % or more, and a rare earth element concentration gradient S is −0.010 atom %/nm≤S≤0.009 atom %/nm which is calculated from a rare earth element concentration at 10 nm towards inner side from an outermost surface of the dielectric particle and a rare earth element concentration at 10 nm towards a shell side from a core-shell interface of the dielectric particle.

The dielectric ceramic composition according to a second embodiment of the present invention is a dielectric ceramic composition having a dielectric particle having a core-shell structure which includes a main component expressed by a general formula $ABO_3$ (A is at least one selected from Ba, Sr, and Ca; and B is at least one selected from Ti, Zr, and Hf) and a rare earth element component R (R is at least one selected from Sc, Y, La, Ce, Pr, Nd, Pm, Sm, Eu, Gd, Tb, Dy, Ho, Er, Tm, Yb, and Lu), in which a shell part of the core-shell structure has an average rare earth element concentration C of 0.3 atom % or more, and a standard deviation σ of a rare earth element concentration satisfies σ/C≤0.15 within an area between 10 nm towards inner side from an outermost surface of the dielectric particle and 10 nm towards a shell side from a core-shell interface of the dielectric particle.

In the first and second embodiments, an average particle size of the dielectric particle is preferably 0.16 to 0.26 μm.

The multilayer ceramic electronic component according to the present embodiment has a multilayer structure in which an internal electrode layer and a dielectric layer are stacked in alternating manner and the dielectric layer is constituted from the dielectric ceramic composition according to the present invention.

The dielectric ceramic composition according to the present embodiment includes a dielectric particle having a core-shell structure and a rare earth element concentration gradient is low or a rare earth element concentration is highly uniform in a shell part. As a result, the insulation specific resistance of the dielectric ceramic composition is maintained good even under high electric field intensity and the highly accelerated lifetime is improved.

DETAILED DESCRIPTION OF THE INVENTION

Figure 1:
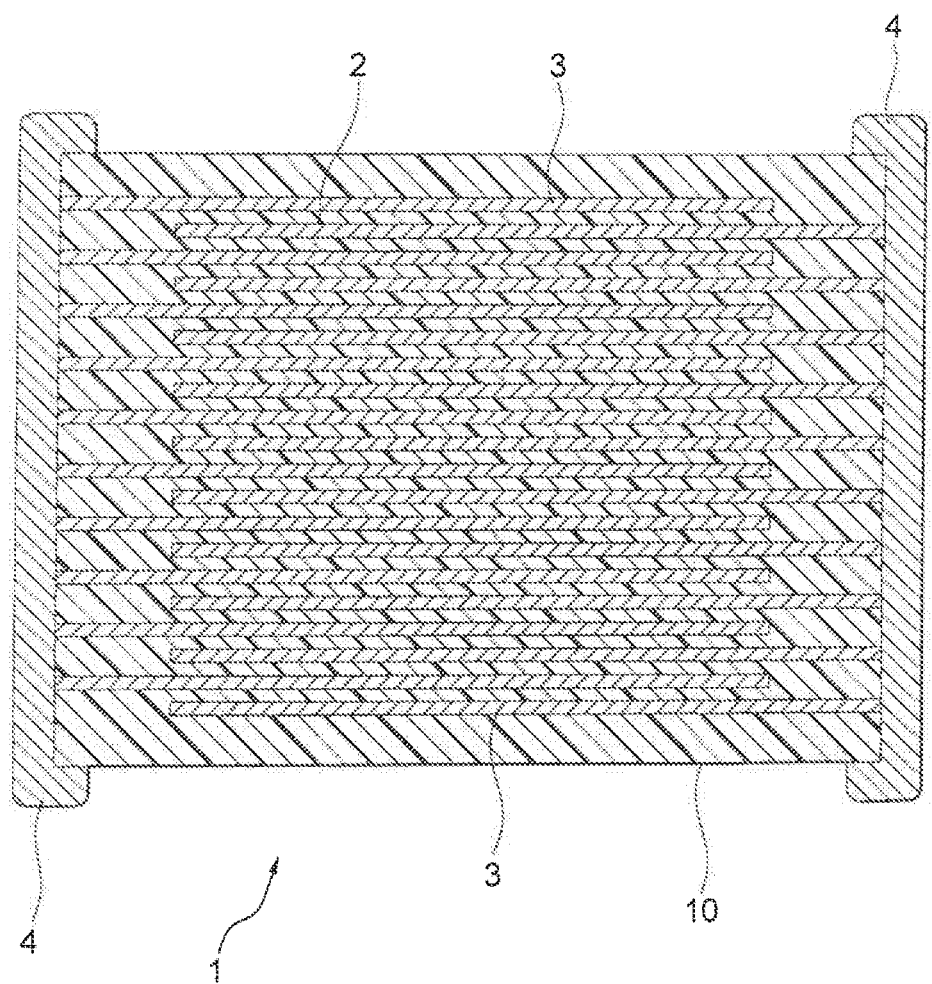
FIG. 1 is a cross section of a multilayer ceramic capacitor according to one embodiment of the present invention.

Hereinafter, the present invention will be described in detail based on an embodiment shown in figures.

<Multilayer Ceramic Capacitor 1>

A multilayer ceramic capacitor 1 according to an embodiment of the present invention has a capacitor element main body 10 having a dielectric layer 2 and an internal electrode layer 3 in alternating manner. At both ends of this element main body 10, a pair of external electrodes 4 is formed which connects with the internal electrode layer 3 placed alternatingly in the element main body 10. A shape of the element main body 10 is not particularly limited, and usually it is rectangular parallelepiped shape. Also, a size of the element main body 10 is not particularly limited, and it may be any appropriate size depending on the purpose of use.

<Dielectric Layer 2>

The dielectric layer 2 is constituted from a dielectric ceramic composition according to the present embodiment. The dielectric ceramic composition includes a main component made of a compound having a perovskite type crystal structure and expressed by a general formula $ABO_3$ (A is at least one selected from the group consisting of Ba, Ca, and Sr; and B is at least one selected from the group consisting of Ti, Zr, and Hf). Further, as a subcomponent, the dielectric ceramic composition includes oxides of rare earth element component R (R is at least one selected from the group consisting of Sc, Y, La, Ce, Pr, Nd, Pm, Sm, Eu, Gd, Tb, Dy, Ho, Er, Tm, Yb, and Lu). Note that, an amount of oxygen (O) may slightly deviate from the stoichiometric composition of the above formula.

In the present embodiment, the compound constituting the main component is preferably expressed by a compositional formula $(Ba_{1-x-y}Ca_xSr_y)TiO_3$.

In the present embodiment, B site atom may be Ti alone, or other element besides Ti (for example Zr and Hf) may be included in B site atom. In this case, if a content of atom besides Ti is 0.3 atom % or less with respect to 100 atom % of B site atom, then it can be considered as an impurity amount.

Also, a molar ratio of A site atom (Ba, Sr, and Ca) and B site atom (Ti) is shown as A/B ratio, and in the present embodiment, A/B ratio is preferably 0.98 to 1.02. Note that, "x" and "y" can be within any range, and preferably it is within below range.

In the present embodiment, "x" of the above formula is preferably $0 \leq x \leq 0.1$. An atomic ratio of Ca is represented by "x", and by having "x" within the above range, a capacitance temperature coefficient and a specific permittivity can be controlled. In the present embodiment, Ca does not necessarily have to be included.

In the present embodiment, "y" of the above formula is preferably $0 \leq y \leq 0.1$. An atomic ratio of Sr is represented by "y", and by having "y" within the above range, a specific permittivity at room temperature can be improved. In the present embodiment, Sr does not necessarily have to be included.

In the present embodiment, the dielectric layer includes oxides of rare earth element as the subcomponent. The content of the oxides of rare earth element may be determined based on desired properties; however it is preferably 0.9 to 2.0 mol and more preferably 0.9 to 1.7 mol in terms of $R_2O_3$ with respect to 100 mol of $ABO_3$. If the content of the oxides of rare earth element is too small, the core-shell particle described in below may not be formed sufficiently. On the other hand, if the content of the oxides of rare earth element is too much, the rare earth element is not uniformly diffused in the shell part, and the rare earth element concentration gradient becomes large. Also, the concentration distribution of the rare earth element becomes non-uniform and the highly accelerated lifetime of the dielectric ceramic composition under high electric field intensity may deteriorate.

The rare earth element is at least one selected from the group consisting of Sc, Y, La, Ce, Pr, Nd, Pm, Sm, Eu, Gd, Tb, Dy, Ho, Er, Tm, Yb, and Lu; and preferably it is at least one selected from group consisting of Y, Tb, Dy, Gd, Ho, and Yb; and particularly preferably it includes Dy.

In the present embodiment, the dielectric layer preferably includes oxides including Si as the subcomponent. A content of oxides including Si may be determined based on the desired properties; however it is preferably 0.6 to 1.2 mol and more preferably 0.8 to 1.1 mol in terms of $SiO_2$ with respect to 100 mol of $ABO_3$. Note that, as the oxides including Si, it may be a composite oxide and like made of Si and other metal element (for example, alkaline metal or alkaline earth metal), and in the present embodiment, it is preferably oxides of Si.

In the present embodiment, the above mentioned dielectric ceramic composition may include other subcomponents depending on the desired properties.

For example, the dielectric ceramic composition according to the present embodiment may include oxides of at least one element selected from the group consisting of Ba, Mn, Mg, and Cr. A content of oxides is preferably 0.02 to 1.6 mol in terms of each oxide with respect to 100 mol of $ABO_3$.

Also, the dielectric ceramic composition according to the present embodiment may include oxides of at least one element selected from the group consisting of V, Ta, Nb, Mo, and W. A content of oxides is preferably 0.02 to 0.30 mol in terms of each oxide with respect to 100 mol of $ABO_3$.

A thickness of the dielectric layer 2 is not particularly limited, and it may be determined accordingly depending on the desired properties and the purpose of use, and preferably it is 1.5 to 10 m and more preferably 1.7 to 5.0 μm or so. Also, the number of the dielectric layer 2 being stacked is not particularly limited, and preferably it is 20 or more, more preferably 50 or more, and particularly preferably 100 or more.

<Structure of Dielectric Particle 20>

Figure 2:
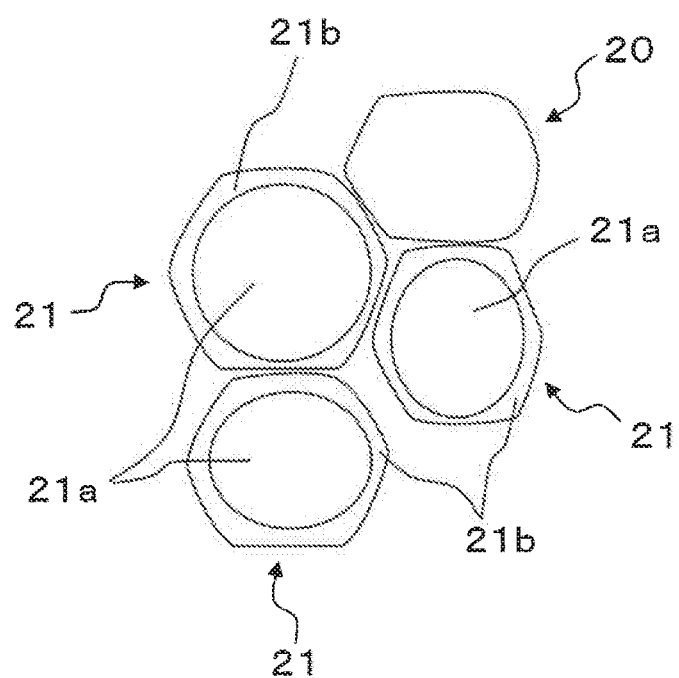
FIG. 2 is a schematic cross section of an enlarged essential part of a dielectric layer shown in FIG. 1.

FIG. 2 shows an enlarged cross section of an essential part of the dielectric layer of FIG. 1. The dielectric layer of the present embodiment is constituted from the dielectric particle having $ABO_3$ as a main component and the rare earth element as a subcomponent is solid dissolved in the dielectric particle. Preferably all of the dielectric particles are a particle 21 having a so called core-shell structure; however a particle 20 which is a complete solid dissolved type may be included as well. Note that, in the present embodiment, a cross section of the dielectric layer is observed to verify the core-shell structure of the dielectric ceramic composition and to analyze the composition thereof. If the cross section is too close to the surface of the dielectric particle, then the shell part may be only observed. In the present embodiment, the rare earth element concentration is measured for the core-shell particle 21 of which the core part can be clearly observed.

Note that, in FIG. 2, in order to make the explanation easier, the dielectric particles 20 and 21 are only shown in the dielectric ceramic composition, but in reality a grain boundary phase exists between the dielectric particles. The grain boundary phase is formed by Si which is used as a sintering aid and oxides of other elements. The grain boundary phase has clearly different composition from the dielectric particle. Also, in the dielectric layer, a segregation phase having excessive amount of rare earth element may exist.

A presence ratio of the dielectric particle 21 having a core-shell structure is preferably 60 to 100% in terms of number ratio when the number of entire dielectric particles constituting the dielectric layer 2 is 100%.

Note that, usually, based on the cross section photograph of the dielectric layer 2, the core-shell structure is verified from a contrast between the core part and the shell part or from a gradient of the rare earth element which is solid dissolved to the main component. Thus, in case the shell part of the dielectric particle is only cut in the cross section photograph even though in reality the dielectric particle has the core-shell structure, the shell part may only appear in the cross section. In such case, the dielectric particle is considered not having the core-shell structure, thus from appearance of the cross section, the upper limit of the area ratio of the dielectric particle 20 having the core-shell structure is 80% or so.

The average particle size of the dielectric particle may be determined based on a thickness of the dielectric layer 2.

Note that, the average particle size of the dielectric particle is not particularly limited, and it is preferably 0.1 to 0.5 μm or so. The average particle size of the dielectric particle is measured by a method usually used. For example, the element main body 10 is cut along the stacking direction of the dielectric layer 2 and the internal electrode layer 3, and an average area of the dielectric particle in the cross section is measured, the diameter is calculated as a circle equivalent diameter then it is multiplied by 1.27 to obtain the average particle size. The particle size is measured for 200 or more dielectric particles, and the value at 50% frequency of the cumulative frequency distribution of the obtained particle sizes is considered as the average particle size (unit: μm).

In the present embodiment, the concentration of each element of the core-shell particle was observed for the cross section of the dielectric layer 2 at a center part of the multilayer ceramic capacitor 1; however the part observed is not limited to a center part of the multilayer ceramic capacitor.

In the present embodiment, among a plurality of dielectric particles, at least a part of the dielectric particles are a particle 21 in which the rare earth element component R is solid dissolved (diffused) in the main component particle. As shown in FIG. 2, such particle is a particle having the core-shell structure (core-shell particle 21) which is constituted from a main phase 21a (core) substantially made of the main component and a diffusion phase 21b (shell) which exist around the main phase 21a and the rare earth element component R is diffused to the main component in the diffusion phase. That is, the main phase 21a is substantially made of the main component and the diffusion phase 21b is made of the main component of which the rare earth element component R is solid dissolved. Note that, in case oxides of element other than the rare earth element component R are included in the dielectric ceramic composition as the subcomponents; these elements may be solid dissolved into the main component particle.

In the first and second embodiments, the average rare earth element concentration C of the shell part is 0.3 atom % or more, preferably 0.4 atom % or more, and more preferably 0.5 atom % or more. In case the rare earth element concentration of the sell part is small, the dielectric layer having sufficient insulation specific resistance may not be formed. On the other hand, if the rare earth element concentration of the shell part is too high, the rare earth element is diffused non-uniformly in the shell part thus the rare earth element concentration gradient becomes large, and also the concentration distribution of the rare earth element becomes non-uniform thus the highly accelerated lifetime of the dielectric ceramic composition under the high electric field intensity may deteriorate. Therefore, the average rare earth element concentration C of the shell part is preferably 0.8 atom % or less, more preferably 0.7 atom % or less, and particularly preferably 0.65 atom % or less.

Figure 3:
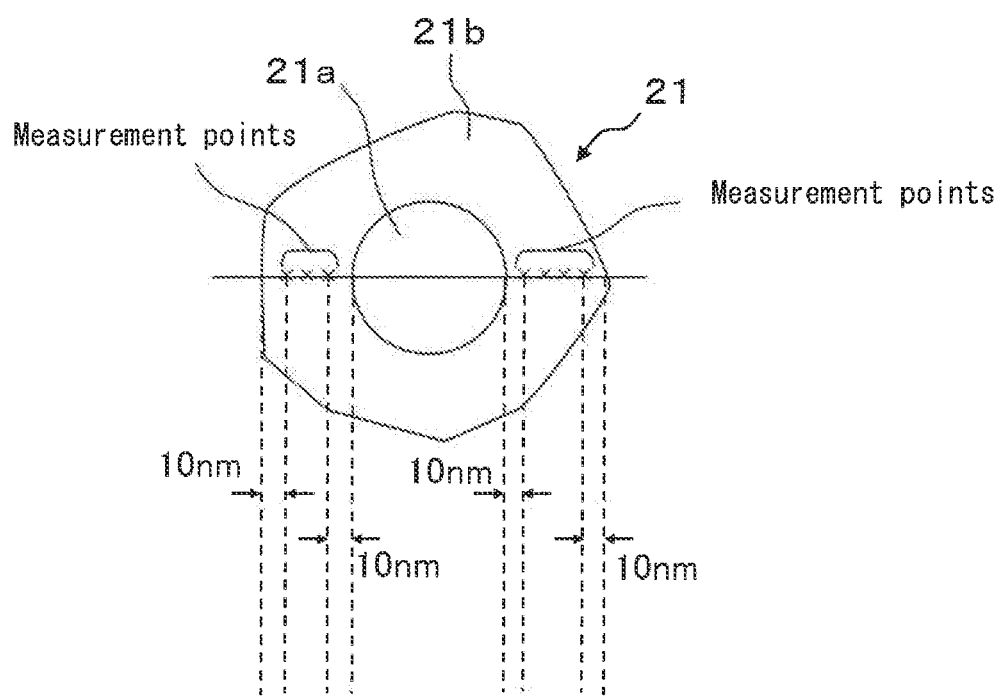
FIG. 3 is a schematic diagram of a core-shell particle which describes measurement points of an average rare earth element concentration C, a rare earth element concentration gradient S, and a standard deviation σ of the rare earth element concentration of a shell part.

In the first embodiment, as shown in FIG. 3, when "S" represents the rare earth element concentration gradient in a direction from near the outermost surface of the core-shell particle towards near the core-shell interface which is between the main phase and the diffusion phase, the rare earth element concentration gradient S satisfies −0.010 atom %/nm≤S≤0.009 atom %/nm, and preferably satisfies −0.006 atom %/nm≤S≤0.006 atom %/nm. When the rare earth element concentration gradient S is positive value, this means that the rare earth element concentration near the outermost surface of the core-shell particle is low and the rare earth element concentration near the core-shell interface is high.

Here, the rare earth element concentration near the outermost surface of the core-shell particle refers to a rare earth element concentration of the shell part at 10 nm towards inner side from the outermost surface of the dielectric particle. Also, the rare earth element concentration near the core-shell interface refers to a rare earth element concentration at a part 10 nm towards the shell side from the core-shell interface of the dielectric particle. The rare earth element concentration gradient S is obtained from a distance and a concentration difference between the both measurement points.

Also, in the second embodiment, the rare earth element concentration in the shell part is uniform. That is, when σ represents a standard deviation of the rare earth element concentrations measured at 5 or more points of the shell part, a ratio (σ/C) between a and the average rare earth element concentration C which represents variations of the concentration is 0.15 or less, and more preferably 0.11 or less.

Here, when measuring the rare earth element concentration of the shell part, the area less than 10 nm from the outermost surface of the dielectric particle and the area less than 10 nm from the core-shell interface of the dielectric particle are excluded from measuring. That is, the rare earth element concentration is measured within the area which is between 10 nm towards inner side from the outermost surface of the dielectric particle and 10 nm towards shell side from the core-shell interface. Also, arbitrarily selected 5 or more core-shell particles are subjected to the measurement of the rare earth element concentration.

Also, in the first and second preferable embodiments, the core-shell particle has an average particle size preferably of 0.16 to 0.26 μm, and more preferably 0.18 to 0.24 μm. If the average particle size of the dielectric particle is too small, an insulation specific resistance may not improve sufficiently; and if it is too large, a highly accelerated lifetime may become short.

Also, in the first and second preferable embodiments, when "rb" represents a radius of the core-shell particle and "ra" represents a length (thickness of the diffusion phase) of the diffusion phase (shell part) in a direction towards the center of the particle from the surface of the particle, ra/rb is 0.20 to 0.50. Also, ra/rb is preferably 0.30 to 0.40.

By having the ratio (ra/rb) of the radius of the particle size and the diffusion phase thickness within the above mentioned range, a reliability of the electronic component can be improved and a capacitance change in a predetermined temperature range can be suppressed.

Also, the ratio of particles satisfying the average rare earth element concentration C and also satisfying the rare earth element concentration gradient S or the rare earth element concentration variation (σ/C) of the shell part as mentioned in above is preferably 60% or more in terms of a number ratio with respect to the entire dielectric particles which are subject of the measurement. By having the ratio of the particles within the above mentioned range, an excellent reliability can be attained and also an excellent capacitance changing rate caused by temperature can be attained. Also, in the present embodiment, even better properties can be attained when the ratio of the dielectric particles satisfying both the average rare earth element concentration C and also satisfying the rare earth element concentration gradient S and the rare earth element concentration variation (σ/C) is 60% or more.

Note that, as shown in FIG. 2, the particle 20 which does not have the core-shell structure may be included in the observing cross section. Also, usually the presence of the core-shell structure is determined based on the cross section photograph of the dielectric layer 2. Therefore, the core-shell particle which only shows the diffusion phase in the cross section photograph exists, even though in reality the particle has the core-shell structure.

The method of measuring the gradient S, standard deviation σ, and average C of the rare earth element concentration, and the particle radius "rb" and the shell part thickness "ra" are not particularly limited and in the present embodiment the below method is performed.

First, the dielectric particle is checked whether it has the core-shell structure. For example, it may be determined based on two phases with different contrasts observed in the dielectric particle of the bright field image by Scanning Transmission Electron Microscope (STEM). Alternatively, it may be determined from a distribution of content ratio of element other than the element constituting the main component of the dielectric particle using Energy Dispersive X-ray Spectroscopy (EDS) of Scanning Transmission Electron Microscope (STEM).

In the present embodiment, the mapping data showing the rare earth element distribution in the dielectric particle is measured, an area having a detection amount of the rare earth element of less than 0.2 atom % is considered as the main phase (core) and an area having the detection amount of 0.2 atom % or more is considered as the diffusion phase (shell). Further, among the particles, a particle having a shell which at least covers part of a core is considered as a particle having the core-shell structure (core-shell particle). Also, at the same time, Si concentration and the like are measured to determine the outlines of the grain boundary phase and segregation phase.

Then, the particles identified as the core-shell particle is subjected to a measurement of the particle size. Next, the average particle radius (rb) of the core-shell particle is obtained. Also, the thickness of the shell part is measured, and the average thereof is represented by "ra". Then, within the observation field, 5 particles or more are selected arbitrarily which are the core-shell particles having 40 nm or more of the thickness of the shell part and having the particle size close to the average particle size. Then, for each dielectric particle, the rare earth element concentration of the area between 10 nm towards inner side from the outermost surface and 10 nm towards shell side from the core-shell interface is measured; thereby the rare earth element concentration gradient S, the average rare earth element concentration C, and the standard deviation σ are obtained.

For the measurement of the rare earth element concentration, as shown in FIG. 3, the core-shell particle is subjected to a point analysis on the straight line passing through roughly the center of the particle 20 using EDS of STEM to measure the rare earth element concentration within the area between 10 nm towards inner side from the outermost surface of the dielectric particle and 10 nm towards shell side from the core-shell interface. A characteristic X ray obtained from the analysis is analyzed and the rare earth element concentration gradient S is calculated from the measurement value at 10 nm towards inner side from the outermost surface of the dielectric particle and the measurement value at 10 nm towards shell side from the core-shell interface. Also, the average rare earth element concentration C, the standard deviation σ, and σ/C are obtained from the measurement value of each measurement point.

<Internal Electrode Layer 3>

A conductive material included in the internal electrode layer 3 is not particularly limited, and in the present embodiment, Ni or Ni alloy is preferable. As Ni alloy, an alloy made of Ni and at least one element selected from the group consisting of Mn, Cr, Co, and Al is preferable; and a content of Ni in the alloy is preferably 95 wt % or more. Note that, in Ni or Ni alloy, various trace amount components such as P and the like may be included in an amount of 0.1 wt % or less or so. The thickness of the internal electrode layer 3 may be determined based on the purpose of use.

When the internal electrode layer 3 is enlarged, in some case there is a part without the internal electrode layer where it should be formed (discontinuous part). This discontinuous part is formed for example by losing the conductive material because a space between conductive material particles adjacent to each other becomes wider when the conductive material particle (mainly Ni particle) becomes spherical due to a particle growth while firing.

The internal electrode layer 3 appears to be discontinuous due to this discontinuous part, but the discontinuous part sporadically exists on a main face of the internal electrode layer 3. Thus, even if the internal electrode layer 3 is discontinuous at a cross section, the internal electrode layer 3 is continuous from other cross section, thus a conductivity of the internal electrode layer 3 is secured. The discontinuous part is formed to the internal electrode layer 3 usually in a ratio of 3 to 35% with respect to an ideal length.

<External Electrode 4>

A conductive material included in the external electrode 4 is not particularly limited, and in the present invention, inexpensive Ni, Cu, and alloys thereof can be used. A thickness of the external electrode 4 may be determined accordingly depending on the purpose of use.

<Method of Producing Multilayer Ceramic Capacitor 1>

The multilayer ceramic capacitor 1 of the present embodiment is produced as similar to the conventional multilayer ceramic capacitor, that is the green chip is produced by a usual printing method or sheet method using a paste, and firing is carried out, followed by printing or transferring of the external electrode then firing; thereby the multilayer ceramic capacitor 1 of the present embodiment is produced. Hereinafter, the production method will be explained.

First, a dielectric raw material for forming the dielectric layer is prepared, then this is made into a paste, thereby a dielectric layer paste is prepared.

As the dielectric raw material, a raw material of $ABO_3$ (main component), a raw material of oxides of rare earth element as a subcomponent, and if necessary a raw material of oxides including Si, and a raw material of other subcomponents are prepared. As these raw materials, oxides of the above mentioned component and the mixture thereof, and composite oxides can be used, and also various compounds which form the above mentioned oxides and composite oxides by firing, such as carbonate, oxalate, nitrate, hydroxides, organometal compound, and the like can be selected accordingly and mixed for use. In the present embodiment, it is preferable to use a mixture in which the raw material of the oxides of rare earth element, the raw material of oxides including Si if needed and other subcomponents are uniformly dispersed to $ABO_3$ main component. However, a dielectric raw material in which the main component is covered with additive components such as the rare earth component, Si, and the like may be used.

Note that, as the raw material of $ABO_3$ (main component), those produced by various methods such as a so called solid phase method and various liquid phase methods (for example an oxalate method, a hydrothermal synthesis method, an alkoxide method, a sol gel method, and the like) can be used.

If a crystallinity of main component is high, diffusion of the rare earth element does not progress, and the rare earth element concentration of the outermost surface of the dielectric particle becomes relatively high, thus the rare earth element concentration gradient S tends to become a negative value. On the other hand, when the crystallinity of main component is low, diffusion of the rare earth element tends to easily progress, and the rare earth element concentration of the outermost surface of the dielectric particle becomes relatively low, thus the rare earth element concentration gradient S tends to be a positive value.

Therefore, in order to attain the appropriate rare earth element concentration gradient S, a firing condition is preferably regulated depending on the crystallinity of the raw material of $ABO_3$ (main component). In case the crystallinity of main component is high, a holding temperature is increased or a holding time is made longer to facilitate the diffusion of the rare earth element component. In case the crystallinity of main component is low, the holding temperature is made relatively low or the holding time is made relatively short to suppress excessive diffusion of the rare earth element component.

Note that, as an index to evaluate the crystallinity of main phase component, c/a of the main component raw material is used. This represents a ratio of c-axis and a-axis of a unit crystal. In order to determine c/a, X-ray diffraction measurement is performed to the main component raw material and then the result thereof is subjected to Rietveld analysis to obtain a lattice constant, thereby c/a can be determined. In the present embodiment, $ABO_3$ powder having intermediate level of crystallinity is preferably used. As the raw material powder having such crystallinity, for example $BaTiO_3$ obtained by an oxalate method may be mentioned.

Further, in case other components besides the above mentioned main component and subcomponent are included in the dielectric layer, as the raw materials of such components, oxides of such components or a mixture thereof, and composite oxides can be used as similar to the above. Also, in addition, various compounds which become the above mentioned oxides and composite oxides by firing can be used as well.

A content of each compound in the dielectric raw material may be determined so that the dielectric ceramic composition attains the composition discussed in above after firing. The particle size of the main component material before made into a paste is usually an average particle size of 0.1 to 0.5 µm or so.

If the particle size of the main component raw material is too large, it would require longer time to diffuse the rare earth element component. Thus, in case the holding temperature is too low or in case the holding time is too short, the rare earth element component may not reach to the core-shell interface and the rare earth element concentration gradient S may become small (absolute value of negative value becomes large).

If the particle size of the main component raw material is too small, the diffusion of the rare earth element component tends to easily progress. Thus, a complete solid dissolved particle tends to be easily produced and in order to obtain the core-shell particle, the holding temperature is lowered or the holding time is shortened to suppress excessive diffusion of the rare earth element component.

The particle size of the subcomponent raw material is preferably an average particle size of 10 to 200 nm, more preferably 30 to 150 nm, and particularly preferably 40 to 120 nm. If the particle size of the subcomponent is too large, the diffusion of the rare earth element component to the main component tends to be non-uniform. Note that, in the present specification, the particle size of the dielectric raw material is measured by a usual method. For example, the particle of the raw material itself is observed by an electron microscope such as SEM, TEM, or the like to measure the area of the particle of the raw material from the image, and a diameter is calculated as a circle equivalent diameter, then it is multiplied by 1.27, thereby the particle size is obtained. The particle size is measured for 200 or more particles, and the value at 50% frequency of the cumulative frequency distribution of the obtained particle sizes is defined as the average particle size (unit: µm or nm).

The dielectric layer paste may be an organic paste kneaded with the dielectric raw material and the organic vehicle, or it may be a water-based paste.

The organic vehicle is obtained by dissolving a binder in an organic solvent. The binder is not particularly limited, and may be properly selected from variety of usual binders such as ethylcellulose, polyvinyl butyral, and the like. Also, the organic solvent is not particularly limited, and may be appropriately selected from variety of organic solvents such as terpineol, butyl carbitol, acetone, toluene, and the like according to a method used such as a printing method, a sheet method, and the like.

Also, when using a water-based dielectric layer paste, dielectric raw materials can be kneaded with a water-based vehicle obtained by dissolving an aqueous binder, a dispersant, and the like in water. The aqueous binder used for a water-based vehicle is not particularly limited, and for example, polyvinyl alcohol, cellulose, aqueous acrylic resin, and the like may be used.

An internal electrode layer paste may be prepared by kneading the above mentioned organic vehicle with the conductive materials made of the above mentioned Ni or Ni alloy; or various oxides, organometallic compound, resinate, and the like which become the above mentioned Ni or Ni alloy after firing. Also, an inhibitor may be included in the internal electrode layer paste. As the inhibitor, it is not particularly limited, and preferably the inhibitor has the same composition as the main component.

An external electrode paste may be prepared as same as the above mentioned internal electrode layer paste.

The content of organic vehicle in each of the above mentioned pastes is not particularly limited, and may be a usual content, for example, the binder is 1 to 5 wt % or so and the solvent is 10 to 50 wt % or so. Also, in each paste, if needed, additives may be included which are selected from variety of dispersant, plasticizers, dielectrics, insulators, and the like. The total contents of these are preferably 10 wt % or less.

When using a printing method, the dielectric layer paste and the internal electrode layer paste are printed on a substrate such as PET and the like to form layers, and after cutting into a predetermined shape, the green chip is obtained by removing from the substrate.

Also, in case of using a sheet method, a green sheet is formed by using the dielectric layer paste and the internal electrode layer paste is printed on the green sheet. Then, these are stacked and cut into a predetermine shape to form a green chip.

Before firing, the green chip is subjected to a binder removal treatment. The binder removal conditions are a temperature increasing rate of preferably 5 to 300° C./hour, a holding temperature of preferably 180 to 900° C., and a temperature holding time of preferably 0.5 to 48 hours. Also, the binder removal atmosphere is air or reduced atmosphere.

After removing a binder, the green chip is fired. In the firing step of the present embodiment, a temperature increasing rate is preferably 500° C./hour or faster, more preferably 800° C./hour or faster, and particularly preferably 1200° C./hour or faster. The upper limit of the temperature increasing rate is not particularly limited, and it is preferably 5000° C./hour or less to avoid excessive burden on a machine. Also, the holding temperature while firing is preferably 1200 to 1350° C., more preferably 1220 to 1340° C., and particularly preferably 1240 to 1320° C. depending on the dielectric material composition. Also, the temperature holding time is preferably 0.2 to 1.5 hours depending on the dielectric material composition. By employing such firing conditions, the rare earth element component can be diffused uniformly into the main component.

The atmosphere of firing is preferably a reduced atmosphere, and preferably wet mixed gas of $N_2$ and $H_2$ can be used.

Also, the oxygen partial pressure may be determined depending on the type of the conductive material in the internal electrode layer paste, and in case of using base metals such as Ni, Ni alloy, and the like as the conductive material, the oxygen partial pressure of the atmosphere is preferably $1.0 \times 10^{-14}$ to $1.0 \times 10^{-10}$ MPa. A temperature decreasing rate is not particularly limited, and in the preferable embodiment, the temperature decreases in a rate of 500 to 5000° C./hour within a high temperature range which is between the holding temperature and 1000° C., and the temperature decreases in a rate of 50 to 500° C./hour within a low temperature range which is 1000° C. or lower.

In the present embodiment, the annealing treatment (oxidizing treatment of the dielectric layer) is preferably carried out to the element main body after firing. Specifically, the holding temperature of the annealing treatment is preferably 1100° C. or less, and more preferably 950 to 1090° C. The holding time is preferably 0 to 20 hours, and more preferably it is 2 to 4 hours. Also, an atmosphere while carrying out the oxidation treatment is preferably wet $N_2$ gas (oxygen partial pressure: $1.0 \times 10^{-9}$ to $1.0 \times 10^{-5}$ MPa).

In case of using $N_2$ gas, a mixed gas, and the like during the above mentioned binder removal treatment, firing, and oxidizing treatment, for example a wetter and the like may be used. In this case, a water temperature is 5 to 75° C. or so.

The binder removal treatment, firing, and oxidizing treatment may be performed continuously or independently.

By controlling the firing conditions as mentioned in above, the rare earth element component is easily diffused uniformly to the main component phase. Particularly, in order to produce a shell part having uniform rare earth element composition, it is important that the crystallinity of $BaTiO_3$ particle as the main component is regulated within an appropriate range, the average particle size of the rare earth oxides is made small, a temperature increasing rate during firing is fast, and a holding temperature is set high.

The capacitor element body obtained as mentioned in above is then subjected to an end surface polishing, for example by a barrel polishing or a sand blasting, and the external electrode paste is pasted thereon, and then fired, thereby the external electrode 4 is formed. If needed, a covering layer may be formed on the surface of the external electrode 4 by plating or so.

The multilayer ceramic capacitor of the present embodiment produced as such is mounted on the printed-circuit board and the like by soldering and the like to be used in variety of electronic devices and the like.

Note that, the present invention is not to be limited to the above-mentioned embodiments and can be variously modified within the scope of the present invention.

In the above mentioned embodiments, the rare earth element is uniformly diffused to the main component phase by regulating the raw material particle size of the subcomponent and the firing conditions, but the present invention is not limited to this method.

Also, in the above mentioned embodiment, the multilayer ceramic capacitor is described as an example of the multilayer ceramic electronic component according to the present invention, however it is not limited to the multilayer ceramic capacitor, and it may be any electronic component having the above constitutions.

EXAMPLES

Hereinafter, the present invention will be described based on further detailed examples, but the present invention is not to be limited to the examples.
(Property Evaluation)

A dielectric layer of a capacitor sample obtained in below examples was observed and for a particle identified as a core-shell particle, a particle size was measured to attain an average particle size. Also, a rare earth element concentration of a shell part was measured to obtain a rare earth element concentration gradient S, an average rare earth element concentration C, and a standard deviation σ. Details regarding these are described in below. Also, for the obtained capacitor sample, an insulation specific resistance and a highly accelerated lifetime were respectively measured by below described methods.
<Rare Earth Element Concentration of Shell Part>

The capacitor sample was cut at a perpendicular face to the dielectric layer. This cross section face was subjected to a surface analysis using EDS of Transmission Electron Microscope (TEM); thereby a mapping data of the rare earth element was obtained. Also, at the same time, Si concentration and the like were measured to determine outlines of grain boundary phase and segregation phase.

Based on the obtained data, an area identified as the dielectric particle were categorized into an area having less than 0.2 atom % of a rare earth element concentration and an area having 0.2 atom % or more. A dielectric particle having both of the areas was determined as a dielectric particle having a core-shell structure.

Next, for the particles having the core-shell structure, a rare earth element concentration of the shell part was measured. In an observation field, 5 or more core-shell particles were selected arbitrarily which having a thickness of shell part of 40 nm or more and having a particle size close to an average particle size. Then, for each dielectric particle, the rare earth element concentration in an area between 10 nm towards inner side from the outermost surface and 10 nm towards shell side from the core-shell interface was measured. As shown in FIG. 3, a point analysis of the rare earth element concentration was carried out to an area on a straight line passing through roughly the center of the particle 2 and between 10 nm towards inner side from the outermost surface and 10 nm towards shell side from the core-shell interface. The point analysis was carried out every 5 nm within this area. A characteristic X-ray obtained from the analysis was analyzed, and a rare earth element concentration gradient S was calculated from the measurement value at 10 nm towards inner side from the outermost surface of the dielectric particle and 10 nm towards shell side from the core-shell interface of the dielectric particle. Also, from the measurement value at each measurement point, an average rare earth element concentration C, a standard deviation σ, and σ/C were obtained.

<Dielectric Average Particle Size>

The capacitor sample was polished all the way to a center of the capacitor sample and a polished face was subjected to a thermal etching treatment at a temperature 100° C. lower than a firing temperature. The polished face after the treatment was observed using a field emission scanning electron microscope (FE-SEM), and SEM image by a secondary electron image was taken. This SEM image was subjected to an image processing by software to identify boundary of the dielectric particle, thereby the area of each dielectric particle was calculated. Then, the area of calculated dielectric particle was converted to a circle equivalent diameter and multiplied by 1.27 to obtain the dielectric particle size. This measurement was carried out to 2000 dielectric particles and a median diameter thereof was considered as a dielectric average particle size.

<Insulation Specific Resistance ($\rho$)>

Using an insulation resistance meter (R8340A by Advantest) to a capacitor sample, DC voltage of 50 V was applied at 20° C. for 10 seconds and left for 50 seconds, then the insulation resistance IR after applying voltage was measured. An insulation specific resistance p was calculated from the measured insulation resistance, an electrode area, and interlayer thickness. In the present examples, $1.0 \times 10^{11}$ $\Omega \cdot m$ or more was considered good, $1.0 \times 10^{12}$ $\Omega \cdot m$ or more was considered excellent, and less than $1.0 \times 10^{11}$ $\Omega \cdot m$ was considered poor.

<Highly Accelerated Lifetime (HALT)>

The capacitor sample was applied with DC voltage under the electric field of 25 V/µm at 175° C. to measure a lifetime thereby a highly accelerated lifetime was evaluated. In the present example, the lifetime was defined as the time which took for the insulation resistance to drop by one digit from the start of the voltage application. Also, in the present examples, the above mentioned evaluation was carried out to 20 capacitor samples and the average thereof was defined as the highly accelerated lifetime. In the present examples, 50 hours or longer was considered good and 100 hours or longer was considered as excellent.

A crystallinity of $BaTiO_3$ powder as a main component raw material was evaluated as below. The main component raw material was subjected to X-ray diffraction measurement using X-ray diffractometer (D8 ADVANCE made by Bruker) and then the result thereof was subjected to Rietveld analysis to determine length of a-axis and c-axis of unit crystal lattice. Crystallinity can be determined by a ratio (c/a) of a-axis and c-axis of a unit lattice.

In the present examples, 1.010 or more of c/a was considered high crystallinity (H), 1.009 or less was considered low crystallinity (L), and crystallinity between these was considered intermediate crystallinity (M) (c/a: more than 1.009 and less than 1.010).

As raw material powder, below materials were prepared.

<Main Component Raw Material>

$BaTiO_3$ powder (average particle size 0.17 µm, crystallinity H)

$BaTiO_3$ powder (average particle size 0.17 µm, crystallinity M)

$BaTiO_3$ powder (average particle size 0.17 µm, crystallinity L)

$BaTiO_3$ powder (average particle size 0.12 µm, crystallinity L)

$BaTiO_3$ powder (average particle size 0.28 µm, crystallinity M)

Note that, in all of the above mentioned raw materials, Ba/Ti was 1.004.

<Subcomponent Material>

$Dy_2O_3$ (two types were prepared having different average particle size of 0.05 µm and 0.10 µm)

$Gd_2O_3$ (average particle size 0.05 µm)

$Tb_2O_3$ (average particle size 0.05 µm)

$Y_2O_3$ (average particle size 0.05 µm)

$Ho_2O_3$ (average particle size 0.05 µm)

$Yb_2O_3$ (average particle size 0.05 µm)

<Sample No. 1 to 5>

As the raw material powder of barium titanate, $BaTiO_3$ powder (Ba/Ti=1.004) having the average particle size and crystallinity described in Table 1 was prepared.

As the subcomponent raw material, below powders were prepared. As a rare earth element oxide raw material, $Dy_2O_3$ having the average particle size of 0.05 µm or 0.10 µm was prepared. Also, $BaCO_3$ powder was prepared as Ba oxide raw material, MgO powder was prepared as Mg oxide raw material, $MnCO_3$ powder was prepared as Mn oxide raw material, $V_2O_5$ powder was prepared as V oxide raw material, and $SiO_2$ powder was prepared as a sintering aid.

The raw material powders prepared in above were weighed. $Dy_2O_3$ powder in an amount described in Table 1, 1.0 mol of MgO powder, 1.0 mol of $SiO_2$ powder, 0.5 mol of $BaCO_3$ powder, 0.2 mol of $MnCO_3$ powder, and 0.05 mol of $V_2O_5$ powder were prepared with respect to 100 mol of $BaTiO_3$. Oxide powders excluding $BaTiO_3$ and $Dy_2O_3$ were wet mixed for one hour using a beads mill, then pulverized and dried to obtain the dielectric additive raw material having an average particle size of 0.05 µm. Note that, $BaCO_3$ and $MnCO_3$ become BaO and MnO respectively in the dielectric ceramic composition after firing.

Next, a total of 100 parts by weight of the obtained dielectric additive material, $Dy_2O_3$, and $BaTiO_3$; 10 parts by weight of polyvinylbutyral resin, 5 parts by weight of dioctyl phthalate (DOP) as plasticizer; and 100 parts by weight of alcohol as a solvent were mixed by a beads mill to form paste; thereby a dielectric layer paste was obtained.

Also, aside from the above, 44.6 parts by weight of Ni powder, 52 parts by weight of terpineol, 3 parts by weight of ethyl cellulose, and 0.4 parts by weight of benzotriazole were kneaded by triple roller to form slurry, thereby an internal electrode layer paste was obtained.

Then, using the above obtained dielectric layer paste, a green sheet was formed on a PET film so that the thickness after drying was 4.5 µm. Next, using the internal electrode layer paste, an electrode layer was printed in a predetermined pattern on the green sheet, followed by removing the sheet from the PET film, thereby the green sheet with the electrode layer was obtained. Then, a plurality of green sheets with the electrode layer were stacked and adhered by applying pressure to obtain a green multilayer body. The green multilayer body was cut into a predetermined size to obtain a green chip.

Then, the obtained green chip was subjected to the binder removal treatment, firing, and oxidizing treatment under the following conditions, thereby an element body as a sintered body was obtained.

The binder removal treatment was performed under the condition of the temperature increasing rate: 25° C./hour, the holding temperature: 235° C., the temperature holding time: 8 hours, and the atmosphere: air.

The firing condition was performed under the temperature increasing rate and the oxygen partial pressure shown in Table 1 and the temperature holding time of 0.5 hours. The temperature decreasing rate from the holding temperature to 1000° C. was 2000° C./hour and from 1000° C. or lower it was 200° C./hour. The atmospheric gas was wet mixed gas of $N_2+H_2$ (oxygen partial pressure was $1.0 \times 10^{-12}$ MPa).

The annealing treatment conditions were the temperature increasing rate: 200° C./hour, the holding temperature: 1050° C., the temperature holding time: 3 hours, the temperature decreasing rate: 200° C./hour, and the atmospheric gas: wet gas of $N_2$ (oxygen partial pressure: $1.0 \times 10^{-7}$ MPa).

Note that, a wetter was used to wet the atmospheric gas during firing and oxidizing treatment.

Next, after polishing end faces of the obtained element body with sandblast, Cu was coated as an external electrode to obtain the multilayer ceramic capacitor sample shown in FIG. 1. The size of the obtained capacitor sample was 3.2 mm×1.6 mm×0.7 mm, the thickness of the dielectric layer was 3 μm, and the thickness of the internal electrode layer was 1.0 μm. Also, in general, as the numbers of the dielectric layers placed between the internal electrode layers increase, a reliability such as a highly accelerated lifetime and the like tend to decrease, thus in the examples of the present invention, the numbers of the dielectric layers were 100 layers to observe the change of the highly accelerated lifetime easier.

<Sample No. 6 and 7>

A dielectric layer paste was prepared as similar to Sample No. 2, except that in Sample No. 6, $BaTiO_3$ powder having the average particle size of 0.12 μm was used, and in Sample No. 7, $BaTiO_3$ powder having the average particle size of 0.28 μm was used.

A green chip was obtained as similar to Sample No. 1 except for using the obtained dielectric layer paste. As firing conditions, a temperature increasing rate and a holding temperature shown in Table 1 were employed and a multilayer ceramic capacitor was obtained as similar to Sample No. 1.

<Sample No. 8 to 11>

A dielectric layer paste was prepared as same as Sample No. 2 except that instead of using $Dy_2O_3$ powder, $Gd_2O_3$ powder was used in Sample No. 8, $Tb_2O_3$ powder was used in Sample No. 9, $Y_2O_3$ powder was used in Sample No. 10, and $Ho_2O_3$ powder was used in Sample No. 11.

A green chip was obtained as similar to Sample No. 1 except for using the obtained dielectric layer paste. As firing conditions, a temperature increasing rate and a holding temperature shown in Table 1 were employed and a multilayer ceramic capacitor was obtained as similar to Sample No. 1.

<Sample No. 12 to 14>

A dielectric layer paste was prepared as same as Sample No. 2 except for following. In Sample No. 12, as a rare earth element compound, 1.0 mol of $Dy_2O_3$ powder (average particle size 0.05 μm) and 0.3 mol of $Ho_2O_3$ powder were used with respect to 100 mol of $BaTiO_3$. In Sample No. 13, as a rare earth element compound, 1.0 mol of $Dy_2O_3$ powder (average particle size 0.05 μm), 0.3 mol of $Ho_2O_3$ powder, and 0.2 mol of $Yb_2O_3$ powder were used with respect to 100 mol of $BaTiO_3$. In Sample No. 14, as a rare earth element compound, 1.0 mol of $Dy_2O_3$ powder (average particle size 0.05 μm), 0.3 mol of $Tb_2O_3$ powder, 0.2 mol of $Yb_2O_3$ powder were used with respect to 100 mol of $BaTiO_3$.

A green chip was obtained as similar to Sample No. 1 except for using the obtained dielectric layer paste. As firing conditions, a temperature increasing rate and a holding temperature shown in Table 1 were employed, and a multilayer ceramic capacitor was obtained as similar to Sample No. 1.

The temperature increasing rate, the holding temperature, the average particle size of $BaTiO_3$, the crystallinity, the type and average particle size of the rare earth element oxides, and the blending amount of the rare earth element oxides with respect to 100 mol of $BaTiO_3$ during the preparation of each capacitor sample are shown in Table 1. Note that, in Table 1, "Dy: 0.05" in a column indicated as "Type of rare earth element component: Average particle size" refers to $Dy_2O_3$ powder having the average particle size of 0.05 μm. Also, "Dy: 1" in a column indicated as "Blending amount of rare earth element oxides" means that 1 mol of $Dy_2O_3$ powder with respect to 100 mol of $BaTiO_3$ was used. Same applies to other rare earth element oxides.

Also, the rare earth element concentration gradient S, the ratio σ/C of average rare earth element concentration C and standard deviation σ, and the measurement result of insulation specific resistance and highly accelerated lifetime are shown in Table 2. Note that, the sample indicated with "*" did not satisfy at least one of the average rare earth element concentration C, the rare earth element concentration gradient S, and the variation σ/C of the rare earth element concentration of the shell part defined in the present invention.

TABLE 1

| Sample No. | Temp. increasing rate [° C./ hour] | Holding temp. [° C.] | BaTO₃ Ave. particle size (μm) | Crystallinity | Type of rare earth element oxide: Ave. particle size | Blending amount of rare earth element oxide (mol) |
|---|---|---|---|---|---|---|
| *1 | 2000 | 1280 | 0.17 | H | Dy0.10 | Dy:1 |
| 2 | 2000 | 1280 | 0.17 | M | Dy0.05 | Dy:1 |
| 3 | 1000 | 1260 | 0.17 | L | Dy0.05 | Dy:1 |
| *4 | 200 | 1240 | 0.17 | L | Dy0.05 | Dy:1 |
| *5 | 2000 | 1220 | 0.17 | H | Dy0.10 | Dy:0.8 |
| 6 | 2000 | 1260 | 0.12 | L | Dy0.05 | Dy:1 |
| 7 | 2000 | 1300 | 0.28 | M | Dy0.05 | Dy:1 |
| 8 | 2000 | 1300 | 0.17 | M | Gd0.05 | Gd:1 |
| 9 | 2000 | 1280 | 0.17 | M | Tb0.05 | Tb:1 |
| 10 | 2000 | 1280 | 0.17 | M | Y0.05 | Y:1 |
| 11 | 2000 | 1260 | 0.17 | M | Ho0.05 | Ho:1 |
| 12 | 2000 | 1280 | 0.17 | M | Dy0.05, Ho0.05 | Dy:1, Ho:0.3 |
| 13 | 2000 | 1280 | 0.17 | M | Dy0.05, Ho0.05, Yb0.05 | Dy:1, Ho:0.3, Yb:0.2 |
| 14 | 2000 | 1280 | 0.17 | M | Dy0.05, Tb0.05, Yb0.05 | Dy:1, Tb:0.3, Yb:0.2 |

TABLE 2

| Sample No. | Rare earth element concentration of shell part | | | Dielectric particle | | |
|---|---|---|---|---|---|---|
| | Concentration gradient S (atom %/nm) | Ave. concentration C (atom %) | Variation (σ/C) | Ave. particle size (μm) | Insulation specific resistance [Ω · m] | Highly accelerated lifetime [hour] |
| ✗1 | −0.013 | 0.51 | 0.33 | 0.22 | 1.80E+11 | 21 |
| 2 | 0.001 | 0.53 | 0.11 | 0.21 | 2.50E+12 | 187 |
| 3 | 0.009 | 0.56 | 0.13 | 0.20 | 1.26E+11 | 53 |
| ✗4 | 0.015 | 0.57 | 0.21 | 0.20 | 1.01E+11 | 18 |
| ✗5 | 0.002 | 0.27 | 0.09 | 0.19 | 2.30E+09 | 2 |
| 6 | 0.003 | 0.46 | 0.12 | 0.13 | 5.10E+11 | 143 |
| 7 | −0.010 | 0.62 | 0.15 | 0.30 | 7.90E+11 | 86 |
| 8 | 0.007 | 0.55 | 0.14 | 0.24 | 1.10E+11 | 82 |
| 9 | 0.005 | 0.54 | 0.12 | 0.23 | 4.30E+11 | 89 |
| 10 | −0.004 | 0.56 | 0.12 | 0.20 | 4.50E+11 | 104 |
| 11 | −0.003 | 0.52 | 0.10 | 0.19 | 1.71E+12 | 121 |
| 12 | 0.003 | 0.56 | 0.09 | 0.20 | 1.08E+12 | 165 |
| 13 | 0.001 | 0.51 | 0.10 | 0.20 | 2.31E+12 | 191 |
| 14 | 0.000 | 0.48 | 0.08 | 0.20 | 1.98E+12 | 178 |

According to Table 2, the multilayer ceramic capacitors (Sample No. 2, 3, 6 to 14) which satisfied the average rare earth element concentration C, the rare earth element concentration gradient S, and the variation σ/C of the rare earth element concentration of the shell part defined in the present invention had better insulation specific resistance and highly accelerated lifetime compared to the capacitors (Sample No. 1, 4, and 5) which did not satisfy the range defined in the present invention.

REFERENCES OF NUMERALS

1 . . . Multilayer ceramic capacitor
2 . . . Dielectric layer
20 . . . Solid dissolved particle
21a . . . Main phase (core)
21b . . . Diffusion phase (shell)
3 . . . Internal electrode layer
4 . . . External electrode
10 . . . Capacitor element main body

What is claimed is:

1. A dielectric ceramic composition comprising comprising:
   a dielectric particle having a core-shell structure including a main component expressed by a general formula $ABO_3$, where A is at least one selected from the group consisting of Ba, Sr, and Ca, and B is at least one selected from the group consisting of Ti, Zr, and Hf; and
   a rare earth element component R, where R is at least one selected from the group consisting of Sc, Y, La, Ce, Pr, Nd, Pm, Sm, Eu, Gd, Tb, Dy, Ho, Er, Tm, Yb, and Lu,
   wherein a core part of the core-shell structure consists essentially of the main component,
   a shell part of the core-shell structure has an average rare earth element concentration C of 0.3 atom % or more, and
   a rare earth element concentration gradient S is −0.006 atom %/nm≤S≤0.006 atom %/nm which is calculated from a rare earth element concentration at 10 nm towards inner side from an outermost surface of the dielectric particle and a rare earth element concentration at 10 nm towards a shell side from a core-shell interface of the dielectric particle.

2. The dielectric ceramic composition according to claim 1, wherein an average particle size of the dielectric particle is 0.16 to 0.26 μm.

* * * * *